US007077895B2

(12) United States Patent
Akui et al.

(10) Patent No.: US 7,077,895 B2
(45) Date of Patent: Jul. 18, 2006

(54) COATING COMPOUND FOR FORMING TITANIUM OXIDE FILM, METHOD FOR FORMING TITANIUM OXIDE FILM AND METAL SUSBSTRATE COATED WITH TITANIUM OXIDE FILM

(75) Inventors: Jun Akui, Hiratsuka (JP); Akinori Nagai, Hiratsuka (JP); Yasuhiko Haruta, Hiratsuka (JP); Osamu Isozaki, Hiratsuka (JP)

(73) Assignee: Kansai Paint Co., Ltd., Amagasaki (JP)

( * ) Notice: Subject to any disclaimer, the term of this patent is extended or adjusted under 35 U.S.C. 154(b) by 0 days.

(21) Appl. No.: 10/492,210

(22) PCT Filed: Oct. 17, 2002

(86) PCT No.: PCT/JP02/10773

§ 371 (c)(1),
(2), (4) Date: Apr. 22, 2004

(87) PCT Pub. No.: WO03/037996

PCT Pub. Date: May 8, 2003

(65) Prior Publication Data

US 2004/0244648 A1    Dec. 9, 2004

(30) Foreign Application Priority Data

Oct. 30, 2001   (JP)   ............................ 2001-331919
Dec. 25, 2001   (JP)   ............................ 2001-390786

(51) Int. Cl.
    *C01G 23/00*      (2006.01)
    *C01G 23/053*     (2006.01)
    *B23B 15/04*      (2006.01)

(52) U.S. Cl. ................. 106/287.19; 428/469; 428/470; 428/472; 428/472.1

(58) Field of Classification Search ........... 106/287.19; 428/469, 470, 472, 472.1
    See application file for complete search history.

(56) References Cited

U.S. PATENT DOCUMENTS

| 3,419,406 | A  |   | 12/1968 | Houle et al. |
|-----------|----|---|---------|--------------|
| 5,759,251 | A  | * | 6/1998  | Nakamura et al. ........ 106/286.4 |
| 6,565,641 | B1 | * | 5/2003  | Isozaki ................... 106/287.19 |
| 6,736,890 | B1 | * | 5/2004  | Haruta et al. .......... 106/287.19 |
| 2003/0152704 | A1 |   | 8/2003  | Haruta et al. ............. 427/372.2 |
| 2003/0205169 | A1 |   | 11/2003 | Isozaki ................... 106/287.19 |

FOREIGN PATENT DOCUMENTS

| EP | 1031538 A1 | 8/2000 |
| EP | 1031538 A1 | 8/2000 |
| EP | 1405826 A1 | 4/2004 |
| GB | 2 350 841 A | 12/2000 |
| JP | 54-24232 | 2/1979 |
| JP | 54-160527 | 12/1979 |
| JP | 58-224174 | 12/1983 |
| JP | 60-50179 | 3/1985 |
| JP | 60-50180 | 3/1985 |
| JP | 7-109584 | 4/1995 |
| JP | 07-109584 | 4/1995 |
| JP | 09-020984 | 1/1997 |
| JP | 09-143752 | 6/1997 |
| JP | 11-36079 | 2/1999 |
| JP | 11-036079 | 2/1999 |
| JP | 11-294993 | 10/1999 |
| JP | 2000-109722 | 4/2000 |
| WO | WO00/46153 | 8/2004 |

OTHER PUBLICATIONS

International Search Report dated Feb. 4, 2003, PCT/JP02/10773.

\* cited by examiner

*Primary Examiner*—David Brunsman
(74) *Attorney, Agent, or Firm*—Armstrong, Kratz, Quintos, Hanson & Brooks, LLP

(57) ABSTRACT

The present invention provides a coating composition for forming a titanium oxide film, comprising (A) a specific titanium-containing aqueous liquid and (B) at least one compound selected from the group consisting of organic acids and their salts. The present invention also provides a process for forming a titanium oxide film using the coating composition, and a metal substrate coated therewith.

17 Claims, No Drawings

COATING COMPOUND FOR FORMING TITANIUM OXIDE FILM, METHOD FOR FORMING TITANIUM OXIDE FILM AND METAL SUSBSTRATE COATED WITH TITANIUM OXIDE FILM

This application is a 371 of PCT/JP02/10773, filed 17 October 2002.

TECHNICAL FIELD

The present invention relates to a novel coating composition for forming a titanium oxide film, process for forming a titanium oxide film, and metal substrate coated with a titanium oxide film.

BACKGROUND ART

Metal substrates such as steel sheets, aluminum and aluminum alloys are usually subjected to various types of surface treatment (undercoating) to improve the corrosion resistance, processability, etc.

In recent years, surface-treated steel sheets are required to have higher corrosion resistance, and therefore zinc-based metal plated steel sheets are frequently used as substrates replacing cold rolled steel sheets.

Conventionally, chromate treatment or phosphate treatment is employed for surface treatment of zinc-based metal plated steel sheets.

Chromate treatment has problems with inherent toxicity of chromium compounds. In particular, hexavalent chromium compounds are extremely harmful substances designated as human carcinogens by IARC (International Agency for Research on Cancer Review) and many other public organizations. Specifically stated, chromate treatment has problems with chromate fumes produced during the treatment process, extremely high cost required for waste water disposal equipment, chromic acid dissolved out from chromate treatment coats, and the like.

Phosphate treatment using zinc phosphate, iron phosphate or like phosphate is usually followed by chromate post-treatment, and thus involves the problems with toxicity of chromium compounds. Moreover, phosphate treatment has problems with disposal of waster water which contains reaction accelerators, metal ions and the like owing to phosphate treatment agents, and sludge disposal necessitated by metal ions dissolved out from treated metals.

Japanese Unexamined Patent Publications No. 1983-224174, No. 1985-50179 and No. 1985-50180 disclose coated steel sheets each comprising a zinc-based metal plated steel sheet as a substrate, a chromate coat formed on the substrate and an organic silicate coat formed on the chromate coat. The disclosed coated steel sheets are excellent in corrosion resistance and processability, but have the problems with toxicity of chromium compounds owing to the chromate coat. Without the chromate coat, the coated steel sheets have insufficient corrosion resistance.

Aluminum or aluminum alloy substrates are also subjected to various types of surface treatment (undercoating) in many cases, to improve the corrosion resistance, hydrophilicity and other properties.

Generally, fins in heat exchangers for air conditioners are made of aluminum or aluminum alloy substrates which are light in weight and excellent in processability and thermal conductivity. In air conditioner heat exchangers, water condenses into droplets and forms water bridges between the fins during cooling operation. The bridges narrow the passageway for air and increase the resistance to air passage, thus causing problems such as power loss, noise, water splashing, etc.

To solve these problems, surfaces of the aluminum or aluminum alloy fins are subjected to boehmite treatment, water glass coating, aqueous polymer coating or like hydrophilizing treatment for preventing bridge formation. However, in a highly corrosive environment, the hydrophilized aluminum or aluminum alloy fins are corroded within a few months or so, partly because of the hydrophilicity of the treatment coat.

To prevent corrosion of the fins, chromate treatment is often employed for undercoating of aluminum or aluminum alloy substrates, since chromate treatment has the advantages of providing good corrosion resistance with low cost. However, chromate treatment is accompanied by the problems with toxicity of chromium compounds as described above.

As chromate-free undercoating materials and undercoating processes, Japanese Unexamined Patent Publication No. 1979-24232 discloses treatment of an aluminum surface with an acid solution comprising a titanium salt, hydrogen peroxide and condensed phosphoric acid; Japanese Unexamined Patent Publication No. 1979-160527 discloses treatment of an aluminum surface with an aqueous alkaline solution containing titanium ions and a complexing agent, followed by water washing and treatment with an aqueous solution of an acid such as phosphoric acid; Japanese Unexamined Patent Publication No. 1997-20984 discloses an aluminum surface treating agent comprising phosphoric acid ions, a titanium compound and a fluoride; and Japanese Unexamined Patent Publication No. 1997-143752 discloses an aluminum-based metal surface treating agent comprising a condensed phosphate, titanium salt, fluoride and phosphite.

However, these undercoating materials and processes utilizing titanium compounds have the problems such as insufficient stability of the undercoating materials, lower corrosion resistance of the coat than a chromate treatment coat, insufficient hydrophilicity and insufficient durability of the coat.

In view of the above state of the art, there are demands for an inorganic film-forming material which is useful as an undercoating material for metal substrates such as steel sheets, aluminum, aluminum alloys or the like, and which is capable of forming a film excellent in corrosion resistance and other properties without causing toxicity problems.

DISCLOSURE OF THE INVENTION

An object of the present invention is to provide a novel coating composition and process for forming, on a metal substrate, a titanium oxide film, the composition and process being capable of forming a film excellent in corrosion resistance, adhesion, processability and like properties.

Another object of the invention is to provide a metal substrate coated with a titanium oxide film excellent in corrosion resistance, adhesion, processability and like properties.

Other objects and features of the present invention will become apparent from the following description.

The present invention provides the following novel coating compositions for forming titanium oxide films, processes for forming titanium oxide films and metal substrates coated with titanium oxide films:

1. A coating composition for forming a titanium oxide film, comprising (A) a titanium-containing aqueous liquid obtained by mixing at least one titanium compound selected from the group consisting of hydrolyzable titanium compounds, low condensates of hydrolyzable titanium compounds, titanium hydroxide and low condensates of titanium hydroxide with aqueous hydrogen peroxide, and (B) at least one compound selected from the group consisting of organic acids and their salts.

2. A coating composition according to item 1, wherein the titanium-containing aqueous liquid (A) is an aqueous peroxo titanic acid solution obtained by mixing a hydrolyzable titanium compound and/or its low condensate with aqueous hydrogen peroxide.

3. A coating composition according to item 2, wherein the hydrolyzable titanium compound is a tetraalkoxytitanium represented by the formula

$$Ti(OR)_4 \qquad (1)$$

wherein Rs may be the same or different and each represent $C_1$ to $C_5$ alkyl.

4. A coating composition according to item 2, wherein the low condensate of a hydrolyzable titanium compound is a compound having a condensation degree of 2 to 30 and obtained by self-condensation of tetraalkoxytitanium(s) represented by the formula

$$Ti(OR)_4 \qquad (1)$$

wherein Rs may be the same or different and each represent $C_1$ to $C_5$ alkyl.

5. A coating composition according to item 2, wherein the proportion of the aqueous hydrogen peroxide is 0.1 to 100 parts by weight calculated as hydrogen peroxide, per 10 parts by weight of the hydrolyzable titanium compound and/or its low condensate.

6. A coating composition according to item 2, wherein the titanium-containing aqueous liquid (A) is an aqueous peroxo titanic acid solution obtained by mixing a hydrolyzable titanium compound and/or its low condensate with aqueous hydrogen peroxide in the presence of a titanium oxide sol.

7. A coating composition according to item 6, wherein the titanium oxide sol is an aqueous dispersion of anatase titanium oxide.

8. A coating composition according to item 6, wherein the proportion of the titanium oxide sol is 0.01 to 10 parts by weight as solids, per 1 part by weight of the hydrolyzable titanium compound and/or its low condensate.

9. A coating composition according to item 1, wherein the compound (B) is at least one compound selected from the group consisting of hydroxycarboxylic acids, hydroxyl-containing organic phosphorous acids, carboxyl-containing organic phosphorous acids and salts of these acids.

10. A coating composition according to item 1, wherein the proportion of the compound (B) is 1 to 400 parts by weight per 100 parts by weight of the solids in the titanium-containing aqueous liquid (A).

11. A coating composition according to item 1, which is an aqueous liquid having a pH of 1 to 10.

12. A coating composition according to item 11, which is an aqueous liquid having a pH of 1 to 9.

13. A coating composition according to item 1, which further comprises an inorganic phosphoric acid compound.

14. A coating composition according to item 1, which further comprises at least one halide selected from the group consisting of titanium halides, titanium halide salts, zirconium halides, zirconium halide salts, silicon halides and silicon halide salts.

15. A coating composition according to item 1, which further comprises an aqueous organic high molecular compound.

16. A process for forming a titanium oxide film, comprising applying a coating composition according to item 1 to a metal substrate, followed by drying.

17. A coated metal substrate comprising a metal substrate and a film of a coating composition according to item 1 formed on a surface of the substrate.

18. A coated metal substrate according to item 17, wherein the film has a dry weight of 0.001 to 10 $g/m^2$.

19. A coated metal substrate according to item 17, wherein the metal substrate is made of steel.

20. A coated metal substrate according to item 17, wherein the metal substrate is made of aluminium or an aluminum alloy.

The present inventors carried out extensive research to achieve the above objects. As a result, the inventors found that a coating composition comprising the titanium-containing aqueous liquid (A) and the compound (B), such as an organic acid, is capable of forming, on a metal substrate, a film which is excellent in corrosion resistance, adhesion, processability and like properties, and which is suitable as an undercoat.

The present invention has been accomplished based on these novel findings.

Coating Composition for Forming Titanium Oxide Film

The coating composition for forming a titanium oxide film of the present invention is an aqueous coating composition comprising the titanium-containing aqueous liquid (A) and the compound (B) selected from organic acids and their salts.

The aqueous liquid component (A) for use in the coating composition can be suitably selected from known titanium-containing aqueous liquids obtainable by mixing at least one titanium compound selected from the group consisting of hydrolyzable titanium compounds, low condensates of hydrolyzable titanium compounds, titanium hydroxide and low condensates of titanium hydroxide, with aqueous hydrogen peroxide.

The hydrolyzable titanium compounds are titanium compounds each containing a hydrolyzable group or groups bonded directly to a titanium atom. The compounds produce titanium hydroxide when reacted with water, water vapor or the like. In the hydrolyzable titanium compounds, the groups bonded to the titanium atom may be all hydrolyzable groups, or part of the groups may be previously hydrolyzed to hydroxyl groups.

The hydrolyzable groups may be any groups capable of producing hydroxyl groups when reacted with water. Examples of such groups include lower alkoxyl, and groups forming salts with titanium atoms. Examples of the groups forming salts with titanium atoms include halogen atoms (e.g., chlorine atoms), hydrogen atoms, sulfuric acid ions and the like.

Examples of hydrolyzable titanium compounds containing lower alkoxyl groups as hydrolyzable groups include tetraalkoxytitaniums and the like.

Typical examples of hydrolyzable titanium compounds containing, as hydrolyzable groups, groups forming salts with titanium include titanium chloride, titanium sulfate and the like.

The low condensates of hydrolyzable titanium compounds are products of low self-condensation of the hydrolyzable titanium compounds. In the low condensates, the groups bonded to the titanium atom may be all hydrolyzable groups, or part of the groups may be previously hydrolyzed to hydroxyl groups.

Examples of low condensates of titanium hydroxide include orthotitanic acid (titanium hydroxide gel) obtained by reaction of an aqueous solution of titanium chloride, titanium sulfate or the like with an aqueous solution of an alkali such as ammonia or caustic soda.

The low condensates of hydrolyzable titanium compounds or low condensates of titanium hydroxide have a condensation degree of 2 to 30, preferably 2 to 10.

The aqueous liquid (A) may be a known titanium-containing aqueous liquid obtained by reaction of the above titanium compound with aqueous hydrogen peroxide. Specific examples of such aqueous liquids include the following:

(1) Aqueous peroxo titanic acid solutions described in Japanese Unexamined Patent Publications No. 1988-35419 and No. 1989-224220, obtained by adding aqueous hydrogen peroxide to a gel or sol of hydrous titanium oxide;

(2) Yellow, transparent, viscous aqueous liquids for forming titanium oxide films, described in Japanese Unexamined Patent Publications No. 1997-71418 and No. 1998-67516, obtained by: reacting an aqueous solution of titanium chloride, titanium sulfate or the like with an aqueous solution of an alkali such as ammonia or caustic soda to precipitate a titanium hydroxide gel called orthotitanic acid; isolating the titanium hydroxide gel by decantation; washing the isolated gel with water; and adding aqueous hydrogen peroxide to the gel;

(3) Titanium oxide film-forming aqueous liquids described in Japanese Unexamined Patent Publications No. 2000-247638 and No. 2000-247639, obtained by: adding aqueous hydrogen peroxide to an aqueous solution of an inorganic titanium compound such as titanium chloride, titanium sulfate or the like to prepare a peroxo titanium hydrate; adding a basic substance to the peroxo titanium hydrate; allowing to stand or heating the resulting solution to precipitate a peroxo titanium hydrate polymer; removing dissolved components other than water; and allowing hydrogen peroxide to act.

Preferably, the titanium-containing aqueous liquid (A) is an aqueous peroxo titanic acid solution (A1) obtained by mixing a hydrolyzable titanium compound and/or its low condensate with aqueous hydrogen peroxide.

A particularly preferred example of the titanium compounds is a tetraalkoxytitanium represented by the formula

$$\text{Ti(OR)}_4 \quad (1)$$

wherein Rs may be the same or different and each represent $C_1$ to $C_5$ alkyl. Examples of $C_1$ to $C_5$ alkyl represented by R include methyl, ethyl, n-propyl, isopropyl, n-butyl, isobutyl, sec-butyl, tert-butyl and the like.

The low condensates of titanium compounds are preferably self-condensates of the compounds of the formula (1), having a condensation degree of 2 to 30, preferably 2 to 10.

The proportion of the aqueous hydrogen peroxide relative to the hydrolyzable titanium compound of the formula (1) and/or its low condensate (hereinafter the compound and/or its low condensate is referred to simply as "hydrolyzable titanium compound (T)") is preferably 0.1 to 100 parts by weight, particularly 1 to 20 parts by weight, calculated as hydrogen peroxide, per 10 parts of hydrolyzable titanium compound (T). Less than 0.1 part by weight of aqueous hydrogen peroxide (calculated as hydrogen peroxide) results in insufficient formation of peroxo titanic acid, producing opaque precipitates. On the other hand, if more than 100 parts by weight (calculated as hydrogen peroxide) of aqueous hydrogen peroxide is used, it is likely that part of hydrogen peroxide remains unreacted and emits hazardous active oxygen during storage.

The hydrogen peroxide concentration in the aqueous hydrogen peroxide is not limited, but is preferably 3 to 40 wt. %, considering ease of handling.

The aqueous peroxo titanic acid solution can be prepared usually by mixing the hydrolyzable titanium compound (T) with aqueous hydrogen peroxide with stirring at about 1 to 70° C. for about 10 minutes to about 20 hours. If necessary, methanol, ethanol, n-propanol, isopropanol, ethylene glycol monobutyl ether, propylene glycol monomethyl ether or like water-soluble solvent may also be added.

Presumably, the aqueous peroxo titanic acid solution (A1) is obtained through the following mechanism: When the hydrolyzable titanium compound (T) is mixed with aqueous hydrogen peroxide, the compound is hydrolyzed with water and formed into a hydroxyl-containing titanium compound. Immediately thereafter, hydrogen peroxide is coordinated to the hydroxyl-containing titanium compound to thereby form peroxo titanic acid. The aqueous peroxo titanic acid solution is highly stable at room temperature and durable for long-term storage.

Also preferred is an aqueous peroxo titanic acid solution (A2) obtained by mixing the hydrolyzable titanium compound (T) with aqueous hydrogen peroxide in the presence of a titanium oxide sol, since this solution has improved storage stability and is capable of forming a titanium oxide film improved in corrosion resistance and other properties. The reasons for the improvements is presumed as follows: During preparation of the aqueous solution, the hydrolyzable titanium compound (T) is adsorbed on the titanium oxide sol particles and chemically bonded by condensation to hydroxyl groups generated on the particle surface. Further, the hydrolyzable titanium compound undergoes self-condensation and is converted into a high molecular compound. The high molecular compound is then mixed with aqueous hydrogen peroxide, thereby giving a stable aqueous solution remarkably free of gelation or thickening during storage.

The titanium oxide sol comprises amorphous titanium oxide particles or anatase titanium oxide particles dispersed in water. As the titanium oxide sol, an aqueous dispersion of anatase titanium oxide is preferred from the viewpoint of corrosion resistance. The titanium oxide sol may contain, in addition to water, an aqueous organic solvent such as an alcohol solvent or an alcohol ether solvent.

The titanium oxide sol may be a known one, such as a dispersion of amorphous titanium oxide particles obtained by dispersing titanium oxide agglomerates in water, or a dispersion in water of anatase titanium oxide particles obtained by calcining titanium oxide agglomerates. Amorphous titanium oxide can be converted into anatase titanium oxide by calcination at a temperature not lower than the anatase crystallization temperature, usually at a temperature not lower than 200° C. Examples of titanium oxide agglomerates include (1) agglomerates obtained by hydrolysis of an inorganic titanium compound such as titanium sulfate or titanyl sulfate, (2) agglomerates obtained by hydrolysis of an organic titanium compound such as titanium alkoxide, (3) agglomerates obtained by hydrolysis or neutralization of a solution of titanium halide such as titanium tetrachloride, and the like.

Commercially available titanium oxide sols include, for example, "TKS-201" (a tradename of TEICA Corp., an aqueous sol of anatase titanium oxide particles with an average particle size of 6 nm), "TKS-203" (a tradename of TEICA Corp., an aqueous sol of anatase titanium oxide particles with an average particle size of 6 nm), "TA-15" (a tradename of Nissan Chemical Industries, Ltd., an aqueous sol of anatase titanium oxide particles) and "STS-11" (a tradename of Ishihara Sangyo Kaisha, Ltd., an aqueous sol of anatase titanium oxide particles).

The amount of the titanium oxide sol used when mixing the hydrolyzable titanium compound (T) and aqueous hydrogen peroxide is usually 0.01 to 10 parts by weight as solids, preferably 0.1 to 8 parts by weight as solids, per 1 part by weight of the hydrolyzable titanium compound (T). Less than 0.01 part by weight of the titanium oxide sol fails to achieve the effect of adding the titanium oxide sol, i.e., improvement in storage stability of the coating composition and in corrosion resistance of the titanium oxide film. On the other hand, more than 10 parts by weight of the sol impairs the film-forming properties of the coating composition. Thus, an amount outside the above range is undesirable.

The titanium-containing aqueous liquid (A) may be used in the form of a dispersion of titanium oxide particles with an average particle size not greater than 10 nm. Such a dispersion can be prepared by mixing the hydrolyzable titanium compound (T) with aqueous hydrogen peroxide optionally in the presence of the titanium oxide sol, and then subjecting the resulting aqueous peroxo titanic acid solution to heat treatment or autoclave treatment at a temperature not lower than 80° C. The dispersion usually has a translucent appearance.

If the heat treatment or autoclave treatment is carried out at a temperature lower than 80° C., the crystallization of titanium oxide does not proceed sufficiently. The titanium oxide particles obtained by heat treatment or autoclave treatment have a particle size of not greater than 10 nm, preferably 1 nm to 6 nm. If the titanium oxide particles have a particle size greater than 10 nm, the resulting coating composition has such a low film-forming properties that a film with a dry weight of 1 g/m$^2$ or greater develops cracks.

The aqueous solution (A1), when used as the titanium-containing aqueous liquid (A), usually forms an amorphous titanium oxide film containing a slight amount of hydroxyl groups, under the above drying conditions. The amorphous titanium oxide film has the advantage of higher gas barrier properties. When the titanium-containing aqueous solution (A2) is used as the aqueous solution (A), the solution usually forms an anatase titanium oxide film containing a slight amount of hydroxyl groups, under the above drying conditions.

In the coating composition of the present invention, the at least one compound (B) selected from the group consisting of organic acids and their salts act mainly to improve the corrosion resistance of the resulting film and the storage stability of the coating composition.

Examples of organic acids for use as the compound (B) include organic carboxylic acids such as acetic acid, oxalic acid, glycolic acid, lactic acid, malic acid, citric acid, tartaric acid and gluconic acid; organic sulfonic acids such as methanesulfonic acid, ethanesulfonic acid and p-benzenesulfonic acid; organic sulfinic acids such as 2-amino-ethane-sulfinic acid and p-toluenesulfinic acid; organic nitro compounds such as nitromethane, nitroethane, nitropropionic acid, nitrocatechol, 2-nitroresorcinol and nitrobenzoic acid; phenols such as phenol, catechol, resorcinol, hydroquinone, pyrogallol, salicylic acid, gallic acid, benzoic acid, thiophenol, 2-aminothiophenol and 4-ethylthiophenol; organic phosphoric acid compounds such as 1-hydroxymethane-1, 1-diphosphonic acid, 1-hydroxyethane-1,1-diphosphonic acid, 1-hydroxypropane-1,1-diphosphonic acid, nitrilo(amino)trimethylenephosphonic acid, nitrilo(amino)triethylenephosphonic acid, nitrilo (amino) tripropylenephosphonic acid, ethylenediamine tetramethylenephosphonic acid, ethylenediamine tetraethylenephosphonic acid, ethylenediamine tetrapropylenephosphonic acid, N,N-bis(2-phosphoethyl)-hydroxylamine, N,N-bis(2-phosphomethyl) hydroxyamine, hydrolysates of 2-hydroxyethyl phosphonic acid dimethyl ether, 2-hydroxyphosphonoacetic acid and 2-phosphonobutane-1,2,4-tricarboxylic acid; and the like.

Salts of organic acids for use as the compound (B) may be those formed by adding an alkali compound to any of the above organic acids. Examples of the alkali compound include organic or inorganic alkali compounds containing lithium, sodium, potassium, ammonium or the like.

Preferably, the compound (B) is soluble in water.

It is particularly preferable to use, as the compound (B), at least one compound selected from the group consisting of: hydroxycarboxylic acids, such as glycolic acid, lactic acid, malic acid, citric acid, tartaric acid and gluconic acid; hydroxyl-containing organic phosphorous acids, such as 1-hydroxymethane-1,1-diphosphonic acid, 1-hydroxyethane-1,1-diphosphonic acid and 1-hydroxypropane-1,1-diphosphonic acid; carboxyl-containing organic phosphorous acids such as 2-phosphonobutane-1,2,4-tricarboxylic acid, 2-hydroxyphosphonoacetic acid; and their salts, since these compounds show excellent effects on the storage stability of the coating composition, the corrosion resistance of the resulting film, etc.

The proportion of the compound (B) relative to the titanium-containing aqueous liquid (A) is preferably about 1 to 400 parts by weight, more preferably about 10 to 200 parts by weight, per 100 parts by weight of the solids in the aqueous liquid (A). Use of less than 1 part by weight of the compound (B) results in lowered corrosion resistance, whereas more than 400 parts by weight of the compound (B), if used, impairs the film-forming properties and reduce the corrosion resistance. Therefore, a proportion outside the specified range is undesirable.

The coating composition of the present invention is prepared by mixing the titanium-containing aqueous liquid (A) and the at least one compound (B) selected from the group consisting of organic acids and their salts.

Presumably, in the coating composition of the present invention, acidic ions of organic acid group(s) in the compound (B) coordinate to titanium ions so that a complex structure is formed between the acidic ions and the titanium ions. Examples of such organic acid groups include hydroxyl, carboxyl, phosphorous acid and like groups. The complex structure can be easily formed simply by mixing the components (A) and (B), and then allowing the mixture to stand, for example, at room temperature (20° C.) for about 5 minutes to about 1 hour. The mixture may be heated, for example, at about 30 to 70° C. for about 1 to 30 minutes to form a complex structure.

The coating composition of the present invention is a stable aqueous liquid, and usually has a pH of 1 to 10. The composition has particularly good storage stability when it is in an acidic region or weakly alkaline region, and has a pH of preferably 1 to 9, more preferably 1 to 7, further more preferably 1 to 5.

The coating composition may optionally contain, for example, methanol, ethanol, isopropyl alcohol, ethylene glycol, propylene glycol or like hydrophilic solvent. The coating composition may be used as diluted with water or hydrophilic solvent, as required.

The coating composition may contain, as required, an inorganic phosphoric acid compound to improve the corrosion resistance of the resulting film.

Usable inorganic phosphoric acid compounds include, for example, monophosphoric acids such as phosphorous acid, strong phosphoric acid, triphosphoric acid, hypophosphorous acid, hypophosphoric acid, trimetaphosphoric acid, diphosphorous acid, diphosphoric acid, pyrophosphorous acid, pyrophosphoric acid, metaphosphorous acid, metaphosphoric acid and orthophosphoric acid; derivatives and salts of monophosphoric acids; condensed phosphoric acids such as tripolyphosphoric acid, tetraphosphoric acid and hexaphosphoric acid; derivatives and salts of condensed phosphoric acids; and the like. These compounds can be used either singly or in combination. Further, these phosphoric acid compounds may be in the form of salts with alkali compounds. Examples of alkali compounds include organic or inorganic alkali compounds containing lithium, sodium, potassium, ammonium or the like.

These inorganic phosphoric acid compounds are preferably soluble in water.

Particularly preferred phosphoric acid compounds are orthophosphoric acid, sodium pyrophosphate, sodium tripolyphosphate, sodium tetraphosphate, metaphosphoric acid, ammonium metaphosphate, sodium hexametaphosphate and the like, since these phosphoric acid compounds remarkably improve the storage stability of the coating composition, the corrosion resistance of the resulting film, etc.

When an inorganic phosphoric acid compound is used, the proportion of the phosphoric acid compound relative to the titanium-containing aqueous liquid (A) is preferably about 1 to 400 parts by weight, more preferably 10 to 200 parts by weight, per 100 parts by weight of the solids in the aqueous liquid (A).

The coating composition of the present invention may contain, as required, at least one halide selected from the group consisting of titanium halides, titanium halide salts, zirconium halides, zirconium halide salts, silicon halides and silicon halide salts, to further improve the corrosion resistance of the resulting film.

Examples of halogens in these halides include fluorine, chlorine, iodine and the like. Among them, fluorine is particularly preferred to achieve excellent storage stability of the coating composition, high corrosion resistance and moisture resistance of the film, etc. The halide salts are, for example, salts formed with sodium, potassium, lithium, ammonium or the like. Among them, potassium, sodium and ammonium are preferred.

Preferred examples of halides include titanium hydrofluoric acid and like titanium halides; potassium titanium fluoride, ammonium titanium fluoride and like titanium halide salts; zirconium hydrofluoric acid and like zirconium halides; ammonium zirconium fluoride, potassium zirconium fluoride and like zirconium halide salts; hydrosilicofluoric acid and like silicon halides; sodium silicofluoride, ammonium silicofluoride, potassium silicofluoride and like silicon halide salts; and the like.

When any of the above halides is used in the coating composition of the present invention, the proportion thereof is preferably about 1 to 400 parts by weight, more preferably about 10 to 200 parts by weight, per 100 parts by weight of the solids in the titanium-containing aqueous liquid (A).

The coating composition of the present invention may contain, as required, an aqueous organic high molecular compound to improve the film-forming properties of the coating composition, the adhesion to the topcoat, etc.

The aqueous organic high molecular compound may be in the form of an aqueous solution, an aqueous dispersion or an emulsion. The compound can be solubilized, dispersed or emulsified in water by known methods.

Examples of the aqueous organic high molecular compound include compounds having functional groups (e.g., at least one of hydroxyl, carboxyl, amino, imino, sulfide, phosphine and the like) which are by themselves capable of solubilizing or dispersing the compounds in water, and such compounds in which part or all of the functional groups have been neutralized. When the compound is an acidic resin such as a carboxyl-containing resin, the compound can be neutralized with ethanolamine, triethylamine or like amine compound; aqueous ammonia; lithium hydroxide, sodium hydroxide, potassium hydroxide or like alkali metal hydroxide; or the like. When the compound is a basic resin such as an amino-containing resin, the compound can be neutralized with acetic acid, lactic acid or like fatty acid; phosphoric acid or like mineral acid; or the like.

Examples of the aqueous organic high molecular compound include epoxy resins, phenol resins, acrylic resins, urethane resins, polyvinyl alcohol resins, polyoxyalkylene chain-containing resins, olefin-polymerizable unsaturated carboxylic acid copolymer resins, nylon resins, polyglycerin, carboxymethyl cellulose, hydroxymethyl cellulose, hydroxyethyl cellulose and the like.

Preferably, the compound is an epoxy resin, a phenol resin, an acrylic resin, a urethane resin, a polyvinyl alcohol resin, a polyoxyalkylene chain-containing resin, an olefin-polymerizable unsaturated carboxylic acid copolymer resin or the like.

When the compound is highly hydrophilic, the resulting composition is capable of forming a film having both high corrosion resistance and high hydrophilicity, and thus is suitable as a hydrophilizing agent for fins made of aluminum or aluminum alloy.

Preferred examples of epoxy resins include cationic epoxy resins obtained by addition of amine to epoxy resins; acrylic modified epoxy resins, urethane modified epoxy resins and like modified epoxy resins; and the like. Examples of cationic epoxy resins include adducts of epoxy compounds with primary mono- or polyamines, secondary mono- or polyamines, mixtures of primary and secondary polyamines (see, for example, U.S. Pat. No. 3,984,299); adducts of epoxy compounds with secondary mono- or polyamines having ketiminized primary amino groups (see, for example, U.S. Pat. No. 4,017,438); etherification reaction products of epoxy compounds with hydroxyl compounds having ketiminized primary amino groups (see, for example, Japanese Unexamined Patent Publication No. 1984-43013); and the like.

Preferred epoxy compounds include those having a number average molecular weight of 400 to 4,000, particularly 800 to 2,000, and an epoxy equivalent of 190 to 2,000, particularly, 400 to 1,000. Such epoxy compounds can be obtained by, for example, reaction of polyphenol compounds with epichlorohydrin. Examples of polyphenol compounds include bis(4-hydroxyphenyl)-2,2-propane, 4,4-dihydroxybenzophenone, bis(4-hydroxyphenyl)-1,1-ethane, bis(4-hydroxyphenyl)-1,1-isobutane, bis(4-hydroxy-tert-butylphenyl)-2,2-propane, bis(2-hydroxynaphthyl)methane, 1,5-dihydroxynaphthalene, bis(2,4-dihydroxyphenyl)methane, tetra(4-hydroxyphenyl)-1,1,2,2-ethane, 4,4-dihydroxydiphenylsulfone, phenol novolac, cresol novolac and the like.

Preferred phenol resins include those prepared by water-solubilizing high molecular compounds obtained by addition and condensation of phenol components and formaldehydes by heating in the presence of reaction catalysts. Usable as the starting phenol components are bifunctional phenol compounds, trifunctional phenol compounds, tetra- or higher functional phenol compounds or the like. Examples of bifunctional phenol compounds include o-cresol, p-cresol, p-tert-butylphenol, p-ethyl phenol, 2,3-xylenol, 2,5-xylenol and the like. Examples of trifunctional phenol compounds include phenol, m-cresol, m-ethylphenol, 3,5-xylenol, m-methoxyphenol and the like. Examples of tetrafunctional phenol compounds include bisphenol A, bisphenol F and the like. These phenol compounds may be used either singly or in combination.

Preferred acrylic resins include, for example, homopolymers or copolymers of monomers having hydrophilic groups such as carboxyl, amino or hydroxyl, copolymers of hydrophilic group-containing monomers with other copolymerizable monomers, and the like. These resins are obtained by emulsification polymerization, suspension polymerization or solution polymerization, optionally followed by neutralization for conversion to aqueous resins. The resulting resins may be further modified, if required.

Examples of carboxyl-containing monomers include acrylic acid, methacrylic acid, maleic acid, maleic anhydride, crotonic acid, itaconic acid and the like.

Examples of nitrogen-containing monomers include N,N-dimethylaminoethyl (meth)acrylate, N,N-diethylaminoethyl (meth)acrylate, N-t-butylaminoethyl (meth)acrylate and like nitrogen-containing alkyl (meth)acrylates; acrylamide, methacrylamide, N-methyl (meth)acrylamide, N-ethyl (meth)acrylamide, N-methylol (meth)acrylamide, N-methoxymethyl (meth)acrylamide, N-butoxymethyl (meth)acrylamide, N,N-dimethyl (meth)acrylamide, N,N-dimethylaminopropyl (meth)acrylamide, N,N-dimethylaminoethyl (meth)acrylamide and like polymerizable amides; 2-vinylpyridine, 1-vinyl-2-pyrolidone, 4-vinylpyridine and like aromatic nitrogen-containing monomers; allyl amines; and the like.

Examples of hydroxyl-containing monomers include 2-hydroxyethyl (meth)acrylate, hydroxypropyl (meth)acrylate, 2,3-dihydroxybutyl (meth)acrylate, 4-hydroxybutyl (meth)acrylate, polyethylene glycol mono(meth)acrylate and like monoesters of polyhydric alcohols with acrylic acid or methacrylic acid; compounds obtained by subjecting the monoesters of polyhydric alcohols and acrylic acid or methacrylic acid to ring-opening polymerization with ε-caprolactone; and the like.

Other polymerizable monomers include, for example, methyl (meth)acrylate, ethyl (meth)acrylate, n-propyl (meth)acrylate, isopropyl (meth)acrylate, n-butyl (meth) acrylate, isobutyl (meth)acrylate, tert-butyl (meth)acrylate, 2-ethylhexyl (meth)acrylate, n-octyl (meth)acrylate, lauryl (meth)acrylate, tridecyl (meth)acrylate, octadecyl (meth)acrylate, isostearyl (meth)acrylate and like $C_1$ to $C_{24}$ alkyl (meth)acrylates; styrene; vinyl acetate; and the like. These compounds may be used either singly or in combination.

As used herein, the term "(meth)acrylate" is intended to mean acrylate or methacrylate.

Preferred urethane resins include those prepared by: subjecting polyurethane resins obtained from polyols (e.g., polyester polyols or polyether polyols) and diisocyanate to chain extension optionally in the presence of, as a chain extender, a low molecular compound having at least two active hydrogen atoms, such as diol or diamine; and then dispersing or dissolving the urethane resins stably in water. Such urethane resins are disclosed in, for example, Japanese Examined Patent Publications No. 1967-24192, No. 1967-24194, No. 1967-5118, No. 1974-986, No. 1974-33104, No. 1975-15027 and No. 1978-29175.

The polyurethane resins can be dispersed or dissolved stably in water, for example, by the following methods:

(1) Introduce an ionic group such as hydroxyl, amino or carboxyl into the side chain or the terminal of a polyurethane resin to impart hydrophilicity to the resin; and disperse or dissolve the resin in water by self-emulsification.

(2) Disperse a polyurethane resin that has completed reaction or a polyurethane resin whose terminal isocyanate group is blocked with a blocking agent, forcibly in water using an emulsifier and mechanical shear force. Examples of usable blocking agents include oximes, alcohols, phenols, mercaptans, amines and sodium bisulfite.

(3) Mix an isocyanate-terminated polyurethane resin, water, an emulsifier and a chain extender; and using mechanical shear force, disperse the resin while converting the resin into a high molecular resin.

(4) Disperse or dissolve in water a polyurethane resin prepared using, as a starting polyol, a water-soluble polyol such as polyethylene glycol.

The aqueous resins prepared by dispersing or dissolving polyurethane resins by the above methods can be used either singly or in combination.

Diisocyanates usable for synthesis of the polyurethane resins include aromatic, alicyclic or aliphatic diisocyanates. Specific examples of these diisocyanates include hexamethylene diisocyanate, tetramethylene diisocyanate, 3,3'-dimethoxy-4,4'-biphenylene diisocyanate, p-xylylene diisocyanate, m-xylylene diisocyanate, 1,3-(diisocyanatomethyl)-cyclohexanone, 1,4-(diisocyanatomethyl)cyclohexanone, 4,4'-diisocyanatocyclohexanone, 4,4'-methylenebis(cyclohexyl isocyanate), isophorone diisocyanate, 2,4-tolylene diisocyanate, 2,6-tolylene diisocyanate, p-phenylene diisocyanate, diphenylmethane diisocyanate, m-phenylene diisocyanate, 2,4-naphthalene diisocyanate, 3,3'-dimethyl-4,4'-biphenylene diisocyanate, 4,4'-biphenylene diisocyanate, and the like. Among them, particularly preferred are 2,4-tolylene diisocyanate, 2,6-tolylene diisocyanate, hexamethylene diisocyanate and isophorone diisocyanate.

Commercial products of the polyurethane resins include, for example, "Hydran HW-330", "Hydran HW-340" and "Hydran HW-350" (tradenames of Dainippon Ink and Chemicals, Inc.), "Superflex 100", "Superflex 150" and "Superflex F-3438D" (tradenames of Dai-ichi Kogyo Seiyaku Co., Ltd.), and the like.

Preferred polyvinyl alcohol resins are those having a saponification degree not lower than 87%, in particular so-called completely saponified polyvinyl alcohols having a saponification degree not lower than 98%. Further, the resins preferably have a number average molecular weight of 3,000 to 100,000.

Usable polyoxyalkylene chain-containing resins include resins containing polyoxyethylene chains or polyoxypropylene chains. Examples of such resins include polyethylene glycol, polypropylene glycol, blocked polyoxyalkylene glycol in which polyoxyethylene chains and polyoxypropylene chains are bonded to form blocks, and the like.

Preferred as the olefin-polymerizable unsaturated carboxylic acid copolymer resin is at least one of two types of water-dispersible or water-soluble resins, i.e., (i) a copolymer of ethylene, propylene or like olefin and (meth)acrylic acid, maleic acid or like polymerizable unsaturated carboxylic acid, and (ii) a crosslinked resin obtained by adding a polymerizable unsaturated compound to an aqueous dispersion of the above copolymer for emulsification polymerization followed by intraparticle crosslinking.

The copolymer (i) comprises at least one olefin and at least one polymerizable unsaturated carboxylic acid. It is preferable that the copolymer comprises, as a monomer component, 3 to 60 wt. %, preferably 5 to 40 wt. %, of unsaturated carboxylic acid or acids. The copolymer can be dispersed in water by neutralizing acid groups in the copolymer with a basic substance.

The polymerizable unsaturated compound to be added to an aqueous dispersion of the above copolymer for emulsification polymerization and intraparticle crosslinking to prepare the crosslinked resin (ii) may be, for example, any of the vinyl monomers listed above in the description of the water-dispersible or water-soluble acrylic resins. These vinyl monomers can be used either singly or in combination.

When using an aqueous organic high molecular compound in the composition of the present invention, it is preferable that the proportion of the aqueous organic high molecular compound be 10 to 2,000 parts by weight, particularly 100 to 1,000 parts by weight, per 100 parts by weight of the solids in the titanium-containing aqueous liquid (A), from the viewpoints of the stability of the coating composition and the corrosion resistance of the resulting titanium oxide film.

The coating composition of the present invention may contain, as required, bivalent or higher valent ions of Al, Ca, Ti, V, Mn, Co, Fe, Cu, Zn, Zr, Nb, Mo, Ta, W or the like, to improve the acid resistance and alkali resistance of the resulting film.

The coating composition of the present invention may further contain, if necessary, ammonia, a basic organic compound, an alkali metal hydroxide, an alkaline earth metal hydroxide or like basic neutralizer. Preferred basic organic compounds include, for example, ethanolamine and triethylamine, and preferred alkali metal hydroxides include, for example, lithium hydroxide, sodium hydroxide, potassium hydroxide and the like.

The coating composition may contain, if necessary, additives such as a thickening agent, antimicrobial agent, rust-preventive agent, titanium oxide sol, titanium oxide powder, extender pigment, rust-preventive pigment, coloring pigment, surfactant or the like. Usable rust-preventive agents include, for example, tannic acid, phytic acid, benzotriazole, ammonium metavanadate, zirconium ammonium carbonate and the like. Useful extender pigments include, for example, mica, talc, silica, fine silica powder, baryta, clay and the like. Addition of an extender pigment is advantageous since it improves, when an upper coat is formed, the adhesion to the upper coat by the anchor effects.

Process for Forming Titanium Oxide Film and Metal Substrate Coated with Titanium Oxide Film The process for forming a titanium oxide film according to the present invention comprises applying the coating composition of the present invention to a metal substrate, followed by drying. The process produces a metal substrate coated with a titanium oxide film. The coated metal substrate can be used by itself as a rust-resistant coated metal substrate.

The metal substrate for use in the process of the present invention may be any substrate at least having a metal surface. Examples of usable substrates include those having a surface made of iron, aluminum, magnesium, zinc, copper, tin or an alloy containing any of these metals. Particularly preferred are steel sheet substrates and aluminum or aluminum alloy substrates.

Examples of steel sheet substrates include hot-dip galvanized steel sheets, electrogalvanized steel sheets, iron-zinc alloy plated steel sheets, nickel-zinc alloy plated steel sheets, aluminum-zinc alloy plated steel sheets and the like. Examples of aluminium-zinc alloy plated steel sheets include those marketed under tradenames "Galvalium" or "Galfan". Also usable as steel sheet substrates are zinc-based metal plated steel sheets that have been subjected to chemical conversion treatment such as chromate treatment, zinc phosphate treatment or composite oxide film treatment. Further, a steel sheet assembly can be employed as a steel sheet substrate.

Typical examples of aluminium or aluminium alloy substrates include, but are not limited to, heat exchanger fins. The heat exchanger fin to be used as the substrate may be a known one, which may be a separate member before assembly into a heat exchanger, or a member assembled into a heat exchanger.

The coating composition of the present invention can be applied to a metal substrate by any known process, such as dip coating, shower coating, spray coating, roll coating and electrocoating. It is usually preferable that the composition be dried for about 2 seconds to about 30 minutes by heating under such conditions that the substrate reaches a maximum temperature of about 60 to 250° C.

The amount of the coating composition to be applied is preferably about 0.001 to 10 $g/m^2$, more preferably 0.1 to 5 $g/m^2$, based on a dry film weight. If the amount is less than 0.001 $g/m^2$, the resulting film is poor in corrosion resistance, water resistance or like properties, whereas if the amount is more than 10 $g/m^2$, the resulting film develops cracks or has reduced corrosion resistance. Thus, an amount outside the specified range is undesirable.

In this manner, the process of the present invention produces, on a metal substrate, a titanium oxide film excellent in corrosion resistance, adhesion, processability, fingerprint resistance, etc.

The coating composition may be applied to a non-metal substrate and dried to form a titanium oxide film.

Examples of non-metal substrates include, but are not limited to, plastic substrates made of polyvinyl chloride resins, polyethylene terephthalate, acrylic resins, silicon resins, polyester resins, fluorine resins, epoxy resins, polyethylene resins, nylon resins, butyral resins, cellulose resins, phenol resins or combinations of two or more of these resins; glass, cement or like inorganic substrates; wood, paper, fiber or like pulp substrates; these plastic substrates, inorganic substrates or pulp substrates as surface-treated or treated with primers; and the like.

The coating composition can be applied to these substrates by any known process, such as dip coating, shower coating, spray coating, roll coating or electrocoating. It is usually preferable that the composition be dried for about 2 seconds to about 30 minutes by heating under such conditions that the substrate reaches a maximum temperature of about 20 to 250° C. The amount of the coating composition to be applied is preferably about 0.001 to 10 $g/m^2$ based on a dry film weight.

An upper coat may be formed on the substrate coated with the titanium oxide film of the coating composition of the present invention. The composition for forming the upper coat can be selected from various coating compositions according to the intended purpose. Examples of coating compositions useful for forming the upper coat include lubricant film-forming compositions, highly corrosion resistant film-forming compositions, primer compositions, colored topcoat compositions and the like. It is also possible to apply and dry a lubricant film-forming composition, a highly corrosion resistant film-forming composition or a primer composition, and then further apply a colored topcoat composition on the resulting coat.

Aluminum or aluminum alloy substrates coated with the coating composition of the present invention are excellent in corrosion resistance, hydrophilicity, adhesion, processability and like properties. The substrates, when irradiated with light, are further improved in hydrophilicity.

When an aluminium or aluminium alloy substrate coated with a film formed from the coating composition of the invention is used for a heat exchanger fin, the film may be coated with a hydrophilizing coat, if required.

The hydrophilizing coat has a hydrophilic surface, sufficient strength, high water resistance and good adhesion to undercoats. The hydrophilizing coat can be preferably formed by applying and drying a hydrophilizing composition.

The hydrophilizing composition preferably contains a hydrophilic film-forming binder. Preferred hydrophilic film-forming binders include, for example, (1) an organic resin binder mainly comprising a hydrophilic organic resin and optionally containing a crosslinking agent, (2) an organic resin/colloidal silica binder mainly comprising a hydrophilic organic resin and colloidal silica and optionally containing a crosslinking agent, (3) a water glass binder made of a mixture of alkali silicate and an anionic or nonionic aqueous organic resin as main components, and the like. Among these binders, the organic resin binder (1) and the organic resin/colloidal silica binder (2) are particularly preferred.

BEST MODE FOR CARRYING OUT THE INVENTION

The following Production Examples, Examples and Comparative Examples are provided to illustrate the present invention in further detail, and do not limit the scope of the invention. In the following examples, parts and percentages are all by weight.

Preparation of Titanium-Containing Aqueous Liquid (A)

Production Example 1

A 10% aqueous ammonia solution was added dropwise to 500 cc of an aqueous solution obtained by diluting 5 cc of a 60% aqueous titanium tetrachloride solution with distilled water, to precipitate titanium hydroxide. The precipitates were washed with distilled water, mixed with 10 cc of 30% aqueous hydrogen peroxide and stirred, giving 70 cc of a yellow, translucent, viscous liquid containing peroxo titanic acid (titanium-containing aqueous liquid (1)) having a solid content of 2%.

Production Example 2

A mixture of 10 parts of tetraisopropoxy titanium and 10 parts of isopropanol was added dropwise to a mixture of 10 parts of 30% aqueous hydrogen peroxide and 100 parts of deionized water, at 20° C. over 1 hour with stirring. Thereafter, the resulting mixture was aged at 25° C. for 2 hours, giving a yellow, transparent, slightly viscous aqueous peroxo titanic acid solution (titanium-containing aqueous liquid (2)) having a solid content of 2%.

Production Example 3

The procedure of Production Example 2 was repeated except that 10 parts of tetra-n-butoxy titanium was used in place of tetraisopropoxy titanium, giving titanium-containing aqueous liquid (3) having a solid content of 2%.

Production Example 4

The procedure of Production Example 2 was repeated except that 10 parts of a trimer of tetraisopropoxy titanium was used in place of tetraisopropoxy titanium, giving titanium-containing aqueous liquid (4) having a solid content of 2%.

Production Example 5

The procedure of Production Example 2 was repeated except that a 3 times greater amount of aqueous hydrogen peroxide was used, and that the dropwise addition was carried out at 50° C. over 1 hour, and that the subsequent aging was carried out at 60° C. for 3 hours. In this manner, titanium-containing aqueous liquid (5) having a solid content of 2% was obtained.

Production Example 6

The titanium-containing aqueous liquid obtained in Production Example 3 was heated at 95° C. for 6 hours, giving a whitish yellow, translucent dispersion of titanium oxide (titanium-containing aqueous liquid (6)) having a solid content of 2%.

Production Example 7

A mixture of 10 parts of tetraisopropoxy titanium and 10 parts of isopropanol was added dropwise to a mixture of 5 parts (as solids) of "TKS-203" (a tradename of TEICA Corp., an aqueous sol of anatase titanium oxide particles with an average particle size of 6 nm), 10 parts of 30% aqueous hydrogen peroxide and 100 parts of deionized water, at 10° C. over 1 hour with stirring. Thereafter, the resulting mixture was aged at 10° C. for 24 hours, giving yellow, transparent, slightly viscous titanium-containing aqueous liquid (7) having a solid content of 2%.

Preparation of Aqueous Organic High Molecular Compounds

Production Example 8

A 1-liter, four-necked flask equipped with a thermometer, stirrer, condenser and dropping funnel was charged with 180 parts of isopropyl alcohol, and purged with nitrogen. Then, the temperature inside the flask was adjusted to 85° C. Added dropwise over about 2 hours were a monomer mixture of 140 parts of ethyl acrylate, 68 parts of methyl methacrylate, 15 parts of styrene, 15 parts of N-n-butoxymethyl acrylamide, 38 parts of 2-hydroxyethyl acrylate and 24 parts of acrylic acid, and 6 parts of 2,2'-azobis(2,4-dimethylvaleronitrile) as a catalyst. After completion of the addition, the reaction was continued at the same temperature for a further 5 hours. As a result, a colorless transparent resin solution was obtained which had a polymerization degree of nearly 100%, a solid content of about 63% and an acid value of about 67 mgKOH/g. The resin solution (500 parts) was mixed with 108 parts of dimethylamino ethanol. After addition of water, the mixture was thoroughly stirred to obtain aqueous acrylic resin dispersion (C1) having a solid content of 30%.

Production Example 9

A reactor equipped with a stirrer, reflux condenser, thermometer and liquid dropper was charged with 1,880 g (0.5 moles) of "Epikote 1009" (a tradename of Shell Chemical Co., an epoxy resin having a molecular weight of 3,750) and 1,000 g of a mixed solvent (methyl isobutyl ketone/xylene=1/1 in weight ratio). The mixture in the reactor was then heated with stirring to obtain a homogeneous solution. The solution was cooled to 70° C., and 70 g of di(n-propanol)amine weighed into the liquid dropper was added dropwise over 30 minutes. During the addition, the reaction temperature was maintained at 70° C. After completion of the addition, the reaction mixture was maintained at 120° C. for 2 hours to complete the reaction, giving an amine-modified epoxy resin having a solid content of 66%. Twenty five parts of 88% formic acid was added per 1,000 g of the resin. After addition of water, the mixture was thoroughly stirred to obtain aqueous amine-modified epoxy resin dispersion (C2) having a solid content of 30%.

Examples of Coating Compositions of the Present Invention

Example 1

A coating composition for forming a titanium oxide film according to the present invention was prepared by mixing 50 parts of titanium-containing aqueous liquid (1) obtained in Production Example 1, 2 parts of 60% 1-hydroxyethane-1,1-diphosphonic acid and 48 parts of deionized water.

Examples 2 to 19 and Comparative Examples 1 to 2

Using the components shown in Table 1, coating compositions of the present invention and comparative coating compositions were prepared in the same manner as in Example 1.

TABLE 1

|  | Example |  |  |  |  |  |  |  |  |  |  |
|---|---|---|---|---|---|---|---|---|---|---|---|
|  | 1 | 2 | 3 | 4 | 5 | 6 | 7 | 8 | 9 | 10 | 11 |
| Component (A) | | | | | | | | | | | |
| (1) | 50 | | | | | | | | | | |
| (2) | | 50 | | | | | | 50 | 50 | 50 | 50 |
| (3) | | | 50 | | | | | | | | |
| (4) | | | | 50 | | | | | | | |
| (5) | | | | | 50 | | | | | | |
| (6) | | | | | | 50 | | | | | |
| (7) | | | | | | | 50 | | | | |
| Component (B) | | | | | | | | | | | |
| 60% 1-hydroxyethane-1,1-diphosphonic acid | 2 | 2 | 2 | 2 | 2 | 2 | 2 | | | | 2 |
| 10% glycolic acid | | | | | | | | 5 | | | |
| 10% malic acid | | | | | | | | | 5 | | 3 |
| 10% citric acid | | | | | | | | | | 5 | |
| 10% orthophosphoric acid | | | | | | | | | | | |
| 10% metaphosphoric acid | | | | | | | | | | | |
| 40% titanium hydrofluoric acid | | | | | | | | | | | |
| 30% aqueous acrylic resin dispersion (C1) | | | | | | | | | | | |
| 30% aqueous amine-modified epoxy resin dispersion (C2) | | | | | | | | | | | |
| 50% vinylidene chloride resin (*1) | | | | | | | | | | | |
| 10% polyvinyl alcohol (*2) | | | | | | | | | | | |
| Fine silica powder (*3) | | | | | | | | | | | |
| Deionized water | 48 | 48 | 48 | 48 | 48 | 48 | 48 | 45 | 45 | 45 | 45 |

|  | Example |  |  |  |  |  |  |  | Comp. Ex. | |
|---|---|---|---|---|---|---|---|---|---|---|
|  | 12 | 13 | 14 | 15 | 16 | 17 | 18 | 19 | 1 | 2 |
| Component (A) | | | | | | | | | | |
| (1) | | | | | | | | | 50 | |
| (2) | 50 | 50 | 50 | 50 | 50 | 50 | 50 | 50 | | 50 |
| (3) | | | | | | | | | | |
| (4) | | | | | | | | | | |
| (5) | | | | | | | | | | |
| (6) | | | | | | | | | | |
| (7) | | | | | | | | | | |
| Component (B) | | | | | | | | | | |
| 60% 1-hydroxyethane-1,1-diphosphonic acid | 2 | 2 | 2 | 2 | 2 | 2 | 2 | 2 | | |
| 10% glycolic acid | | | | | | | | | | |
| 10% malic acid | | | | | | | | | | |
| 10% citric acid | | | | | | | | | | |
| 10% orthophosphoric acid | 5 | | | | | | | | | |
| 10% metaphosphoric acid | | 5 | 5 | | | | | | | |
| 40% titanium hydrofluoric acid | | | 1 | | | | | | | |
| 30% aqueous acrylic resin dispersion (C1) | | | | 2 | | | | | | |
| 30% aqueous amine-modified epoxy resin dispersion (C2) | | | | | 1 | | | | | |
| 50% vinylidene chloride resin (*1) | | | | | | 1 | | | | |
| 10% polyvinyl alcohol (*2) | | | | | | | 3 | | | |
| Fine silica powder (*3) | | | | | | | | 1 | | |
| Deionized water | 43 | 43 | 47 | 42 | 46 | 47 | 47 | 45 | 50 | 50 |

In Table 1, *1 to *3 indicate the following:

*1: "Saran Latex L-411", a tradename of Asahi Kasei Corp., a vinylidene chloride resin having a solid content of 50%

*2: "Kuraray RS Polymer RS-105", a tradename of Kuraray Co., Ltd., a polyvinyl alcohol having a solid content of 10%

*3: "Aerosil 380", a tradename of Nippon Aerosil Co., Ltd., an extender pigment, a fine silica powder having a specific surface area of 380 m$^2$/g and an average particle size of 7 nm Performance Test of the Coating Compositions of the Present Invention The coating compositions obtained in Examples 1 to 19 and Comparative Examples 1 and 2 were applied to metal substrates. The resulting coated substrates were tested for corrosion resistance.

(1) Coating of Aluminum Sheets

Aluminum sheets (A1050) with a thickness of 0.1 mm were degreased with a 2% aqueous solution of an alkaline degreasing agent (a product of Japan CB Chemical Co., tradename "Chemicleaner 561B") and washed with water. The coating compositions were applied by roller coating so that the dry film weight would be 0.2 g/m 2, and baked for 20 seconds under such conditions that the substrate temperature became 100° C., to form titanium oxide films.

(2) Corrosion Resistance of the Coated Sheets

The coated sheets were subjected to the salt spray test defined in JIS Z2371 for 120, 240, 360 and 480 hours, and rated on the following scale.
 a: No white rusting or blistering on the coated surface;
 b: Slight white rusting or blistering;
 c: Serious white rusting or blistering.
Table 2 shows the test results.

TABLE 2

| Coating composition | Test period | | | |
|---|---|---|---|---|
| | 120 hr | 240 hr | 360 hr | 480 hr |
| Ex. 1 | a | a | a | b |
| Ex. 2 | a | a | a | b |
| Ex. 3 | a | a | a | b |
| Ex. 4 | a | a | a | b |
| Ex. 5 | a | a | a | b |
| Ex. 6 | a | a | b | c |
| Ex. 7 | a | a | b | c |
| Ex. 8 | a | a | b | c |
| Ex. 9 | a | a | b | c |
| Ex. 10 | a | a | b | c |
| Ex. 11 | a | a | a | b |
| Ex. 12 | a | a | a | b |
| Ex. 13 | a | a | a | a |
| Ex. 14 | a | a | a | a |
| Ex. 15 | a | a | a | a |
| Ex. 16 | a | a | b | c |
| Ex. 17 | a | a | b | c |
| Ex. 18 | a | a | b | c |
| Ex. 19 | a | a | b | c |
| Comp. Ex. 1 | b | c | c | c |
| Comp. Ex. 2 | b | b | c | c |

(3) Coating of Steel Sheets

Electrogalvanized steel sheets with a thickness of 0.6 mm (the amount of plating on one side: 20 g/m²) were degreased with a 2% aqueous solution of an alkaline degreasing agent (a product of Japan CB Chemical Co., tradename "Chemicleaner 561B") and washed with water. The coating compositions were applied by roller coating so that the dry film weight would be 1.0 g/m², and baked for 20 seconds under such conditions that the substrate temperature became 100° C., to form titanium oxide films.

(4) Corrosion Resistance of the Coated Sheets

The end faces and back face of the coated sheets were sealed. The resulting sheets were subjected to the salt spray test defined in JIS Z2371 for 24, 48 and 72 hours, and rated on the following scale.
 a: No white rusting;
 b: Less than 5% of the coated surface area had white rust;
 c: Not less than 5% but less than 10% of the coated surface area had white rust;
 d: Not less than 10% but less than 50% of the coated surface area had white rust;
 e: 50% or more of the coated surface area had white rust.
Table 3 shows the test results.

TABLE 3

| Coating composition | Test period | | |
|---|---|---|---|
| | 24 hr | 48 hr | 72 hr |
| Ex. 1 | a | a | b |
| Ex. 2 | a | a | b |
| Ex. 3 | a | a | b |
| Ex. 4 | a | a | b |
| Ex. 5 | a | a | b |
| Ex. 6 | a | b | c |
| Ex. 7 | a | b | c |
| Ex. 8 | a | b | c |
| Ex. 9 | a | b | c |
| Ex. 10 | a | b | c |
| Ex. 11 | a | a | b |
| Ex. 12 | a | a | a |
| Ex. 13 | a | a | a |
| Ex. 14 | a | a | a |
| Ex. 15 | a | a | a |
| Ex. 16 | a | b | c |
| Ex. 17 | a | b | c |
| Ex. 18 | a | b | c |
| Ex. 19 | a | b | c |
| Comp. Ex. 1 | c | d | d |
| Comp. Ex. 2 | c | c | d |

(5) Coating of Steel Sheets

The surfaces of electrogalvanized steel sheets with a thickness of 0.6 mm (the amount of plating on one side: 20 g/m²) were alkaline degreased and conditioned by spray coating with "Preparen Z" (a tradename of Nihon Parkerizing Co., Ltd.). Thereafter, the steel sheets were spray-coated with "Palbond 3308" (a tradename of Nihon Parkerizing Co., Ltd., an aqueous zinc phosphate solution), washed with water and dried to obtain zinc phosphate-treated plated steel sheets. The amount of the zinc phosphate treatment coat was 1.5 g/m².

The coating compositions were applied to the surfaces of the zinc phosphate-treated plated steel sheets by spray coating so that the dry film weight would be 1.0 g/m², and baked for 20 seconds under such conditions that the substrate temperature became 100° C., to form titanium oxide films.

(6) Corrosion Resistance of the Coated Sheets

The end faces and back face of the coated sheets were sealed. The resulting sheets were subjected to the salt spray test defined in JIS Z2371 for 24, 48 and 72 hours, and rated on the following scale.
 a: No white rusting;
 b: Less than 5% of the coated surface area had white rust;
 c: Not less than 5% but less than 10% of the coated surface area had white rust;
 d: Not less than 10% but less than 50% of the coated surface area had white rust;
 e: 50% or more of the coated surface area had white rust.
Table 4 shows the test results.

TABLE 4

| Coating composition | Test period | | |
|---|---|---|---|
| | 24 hr | 48 hr | 72 hr |
| Ex. 1 | a | a | b |
| Ex. 2 | a | a | b |

TABLE 4-continued

| Coating composition | Test period | | |
|---|---|---|---|
| | 24 hr | 48 hr | 72 hr |
| Ex. 3 | a | a | b |
| Ex. 4 | a | a | b |
| Ex. 5 | a | a | b |
| Ex. 6 | a | b | c |
| Ex. 7 | a | b | c |
| Ex. 8 | a | b | c |
| Ex. 9 | a | b | c |
| Ex. 10 | a | b | c |
| Ex. 11 | a | a | b |
| Ex. 12 | a | a | a |
| Ex. 13 | a | a | a |
| Ex. 14 | a | a | a |
| Ex. 15 | a | a | a |
| Ex. 16 | a | b | c |
| Ex. 17 | a | b | c |
| Ex. 18 | a | b | c |
| Ex. 19 | a | b | c |
| Comp. Ex. 1 | c | d | d |
| Comp. Ex. 2 | c | c | d |

(7) Undercoating of Steel Sheets and Formation of Upper Coats

Surfaces of hot rolled mild steel sheets (SPCC-SD) with a thickness of 0.6 mm were degreased by spraying a 2% aqueous solution of an alkaline degreasing agent (a product of Japan CB Chemical Co., tradename "Chemicleaner 561B") at 65° C. for 20 seconds, and washed by spraying warm water at 60° C. for 20 seconds. The coating compositions were applied to the degreased steel sheets by spray coating so that the dry film weight would be 1 g/m², and baked in an atmosphere at 250° C. for 15 seconds (the substrate temperature became 100° C.), to form titanium oxide films as undercoats.

"Amilac #1000 White" (a tradename of Kansai Paint Co., Ltd., a thermosetting alkyd resin coating composition, white) was applied to the undercoated sheets so that the dry film weight would be 20 g/m², baked at 130° C. for 20 minutes to form upper coats, and used as test coated sheets.

(8) Performance Test of the Test Coated Sheets

The test coated sheets were tested for corrosion resistance and upper coat adhesion by the following methods.

Corrosion resistance: The end faces and back face of the test coated sheets were sealed. On the coated surface of each test coated sheet, a crosswise cut reaching the substrate was made using a knife, and the resulting sheets were subjected to the salt spray test defined in JIS Z2371 for 120 hours. After the test, adhesive tape was applied to the crosswise cut portion on each test coated sheet, and rapidly peeled off. The width of the peeled-off part of the upper coat was rated on the following scale:
  a: 1 mm or less;
  b: 1 to 3 mm;
  c: 3 to 5 mm;
  d: 5 mm or more.

Upper coat adhesion: On the coated surface of each test coated sheet, 11 each of vertical and horizontal cuts reaching the substrate were made using a knife, to form 100 squares (1 mm×1 mm). Adhesive tape was applied to the cut portion, and rapidly peeled off. Then, the degree of peeling of the upper coat was rated on the following scale.
  a: No peeling at all;
  b: 1 or 2 squares peeled off;
  c: 3 to 10 squares peeled off;
  d: 10 or more squares peeled off.

Table 5 shows the test results.

TABLE 5

| Coating composition | Corrosion resistance (120 hr) | Upper coat adhesion |
|---|---|---|
| Ex. 1 | b | a |
| Ex. 2 | b | a |
| Ex. 3 | b | a |
| Ex. 4 | b | a |
| Ex. 5 | b | a |
| Ex. 6 | c | a |
| Ex. 7 | c | a |
| Ex. 8 | c | a |
| Ex. 9 | c | a |
| Ex. 10 | c | a |
| Ex. 11 | b | a |
| Ex. 12 | a | a |
| Ex. 13 | a | a |
| Ex. 14 | a | a |
| Ex. 15 | a | a |
| Ex. 16 | c | a |
| Ex. 17 | c | a |
| Ex. 18 | c | a |
| Ex. 19 | c | a |
| Comp. Ex. 1 | d | b |
| Comp. Ex. 2 | d | b |

The coating composition for forming a titanium oxide film, process for forming a titanium oxide film, and metal substrate coated with a titanium oxide film according to the present invention have the following remarkable effects.

(1) The coating composition of the present invention has excellent storage stability. This is presumably because the titanium-containing aqueous liquid (A) is stable by itself and forms a stable complex with the organic acid and/or its salt (B).

(2) The process using the coating composition of the present invention is capable of forming, on a metal substrate, an amorphous titanium oxide-containing film excellent in corrosion resistance, adhesion, durability, processability, hydrophilicity and like properties.

The excellent corrosion resistance and durability are achieved presumably because: the film has good adhesion to the substrate; the film is a dense titanium oxide film which has low permeability to oxygen or water vapor; the organic acid and/or its salt (B) coordinates to the metal substrate and functions as a corrosion inhibitor for the metal; and titanium oxide protect the component (B). The film has high adhesion presumably because the titanium oxide in the film contains hydroxyl.

(3) A coated metal substrate obtained by the process of the present invention can be advantageously used as a rust-resistant coated substrate, without further treatment.

(4) A heat exchanger fin comprising an aluminum or aluminum alloy substrate coated with a film formed from the coating composition of the present invention is free from water bridges of condensed water generated during cooling operation, and thus is prevented from corroding.

The invention claimed is:

1. A coating composition for forming a titanium oxide film, comprising:
   (A) an aqueous peroxo titanic acid solution obtained by mixing a hydrolyzable titanium compound and/or its condensate having a condensation degree of 2 to 30, with aqueous hydrogen peroxide, the hydrolyzable titanium compound being a tetraalkoxytitanium represented by the formula $$Ti(OR)_4 \qquad (1)$$

wherein Rs may be the same or different and each represent $C_1$ to $C_5$ alkyl; and (B) at least one compound selected from the group consisting of organic acids and their salts.

2. A coating composition according to claim 1, wherein the proportion of the aqueous hydrogen peroxide is 0.1 to 100 parts by weight calculated as hydrogen peroxide, per 10 parts by weight of the hydrolyzable titanium compound and/or its condensate.

3. A coating composition according to claim 1, wherein the aqueous peroxo titanic acid solution (A) is obtained by mixing a hydrolyzable titanium compound and/or its condensate with aqueous hydrogen peroxide in the presence of a titanium oxide sol.

4. A coating composition according to claim 3, wherein the titanium oxide sol is an aqueous dispersion of anatase titanium oxide.

5. A coating composition according to claim 3, wherein the proportion of the titanium oxide sol is 0.01 to 10 parts by weight as solids, per 1 part by weight of the hydrolyzable titanium compound and/or its condensate.

6. A coating composition according to claim 1, wherein the compound (B) is at least one compound selected from the group consisting of hydroxycarboxylic acids, hydroxyl-containing organic phosphorous acids, carboxyl-containing organic phosphorous acids and salts of these acids.

7. A coating composition according to claim 1, wherein the proportion of the compound (B) is 1 to 400 parts by weight per 100 parts by weight of the solids in the aqueous peroxo titanic acid solution (A).

8. A coating composition according to claim 1, which is an aqueous liquid having a pH of 1 to 10.

9. A coating composition according to claim 8, which is an aqueous liquid having a pH of 1 to 9.

10. A coating composition according to claim 1 for forming a titanium oxide film, comprising (A) a titanium-containing aqueous liquid obtained by mixing at least one titanium compound selected from the group consisting of hydrolyzable titanium compounds, condensates of hydrolyzable titanium compounds having a condensation degree of 2 to 30, titanium hydroxide and condensates of titanium hydroxide having a condensation degree of 2 to 30, with aqueous hydrogen peroxide, and (B) at least one compound selected from the group consisting of organic acids and their salts, which further comprises an inorganic phosphoric acid compound.

11. A coating composition according to claim 1 which further comprises at least one halide selected from the group consisting of titanium halides, titanium halide salts, zirconium halides, zirconium halide salts, silicon halides and silicon halide salts.

12. A coating composition according to claim 1, which further comprises an aqueous organic compound selected from the group consisting of epoxy resins, phenol resins, acrylic resins, urethane resins, polyvinyl alcohol resins, polyoxyalkylene chain-containing resins, olefin-polymerizable unsaturated carboxylic acid copolymer resins, nylon resins, polyglycerin, carboxymethyl cellulose, hydroxymethyl cellulose, and hydroxyethyl cellulose.

13. A process for forming a titanium oxide film, comprising applying a coating composition according to claim 1 to a metal substrate, followed by drying.

14. A coated metal substrate comprising a metal substrate and a film of a coating composition according to claim 1 formed on a surface of the substrate.

15. A coated metal substrate according to claim 14, wherein the film has a dry weight of 0.001 to 10 g/m².

16. A coated metal substrate according to claim 14, wherein the metal substrate is made of steel.

17. A coated metal substrate according to claim 14, wherein the metal substrate is made of aluminium or an aluminum alloy.

* * * * *